US008009395B2

(12) United States Patent
Graves et al.

(10) Patent No.: US 8,009,395 B2
(45) Date of Patent: Aug. 30, 2011

(54) METHODS AND APPARATUS FOR OVER-VOLTAGE PROTECTION OF DEVICE INPUTS

(75) Inventors: Christopher Michael Graves, Sherman, TX (US); John Edward Esquivel, Sherman, TX (US); James Craig Spurlin, Sherman, TX (US)

(73) Assignee: Texas Instruments Incorporated, Dallas, TX (US)

( * ) Notice: Subject to any disclaimer, the term of this patent is extended or adjusted under 35 U.S.C. 154(b) by 383 days.

(21) Appl. No.: 11/936,568

(22) Filed: Nov. 7, 2007

(65) Prior Publication Data

US 2009/0116158 A1 May 7, 2009

(51) Int. Cl.
*H02H 3/20* (2006.01)
(52) U.S. Cl. ............................ 361/56; 361/91.1; 361/111
(58) Field of Classification Search .................... 361/56, 361/91.1
See application file for complete search history.

(56) References Cited

U.S. PATENT DOCUMENTS

| 4,173,740 | A | * | 11/1979 | Nagata et al. ................. 330/298 |
| 4,487,458 | A | * | 12/1984 | Janutka ......................... 327/436 |
| 4,685,020 | A | * | 8/1987 | Driscoll et al. ................. 361/18 |
| 5,144,392 | A | * | 9/1992 | Brotherton .................... 257/350 |
| 5,806,522 | A | * | 9/1998 | Katims ......................... 600/554 |
| 6,927,559 | B2 | * | 8/2005 | Tanigawa et al. .............. 323/316 |
| 2003/0169024 | A1 | * | 9/2003 | Cook ............................. 323/268 |
| 2005/0041350 | A1 | * | 2/2005 | Horng et al. .................. 361/91.1 |
| 2005/0269992 | A1 | * | 12/2005 | Lai et al. ....................... 320/134 |

\* cited by examiner

*Primary Examiner* — Rexford N Barnie
*Assistant Examiner* — Tien Mai
(74) *Attorney, Agent, or Firm* — William B. Kempler; Wade J. Brady, III; Frederick J. Telecky, Jr.

(57) ABSTRACT

Methods and apparatus for over-voltage protection of device inputs are disclosed. An example apparatus to protect a device from an over-voltage condition disclosed herein comprises a switch coupled between a device input and at least one component of the device, and a voltage compensator to pull a control input of the switch to a voltage associated with the device input to open the switch to protect the device component from the over-voltage condition.

24 Claims, 4 Drawing Sheets

METHODS AND APPARATUS FOR OVER-VOLTAGE PROTECTION OF DEVICE INPUTS

FIELD OF THE DISCLOSURE

This disclosure relates generally to over-voltage protection and, more particularly, to methods and apparatus for over-voltage protection of device inputs.

BACKGROUND

Over-voltage protection circuits are often implemented in electronic devices to protect the internal components of these devices from over-voltage conditions associated with the device inputs. For example, an over-voltage condition can occur when an external accessory or component is connected or disconnected from an input of a device while the external accessory or component is active. Such an over-voltage condition may be characterized by a large positive or negative voltage spike that could damage the internal components or circuitry of the device in the absence of an appropriately implemented over-voltage protection circuit.

Many existing over-voltage protection circuits are implemented using active clamp circuits that direct the voltage associated with a device input to ground when an over-voltage condition occurs and/or is detected. However, a typical active clamp circuit requires an active power source to be operational and, thus, may not provide adequate over-voltage protection when the device being protected is inactive.

DETAILED DESCRIPTION

Figure 1:
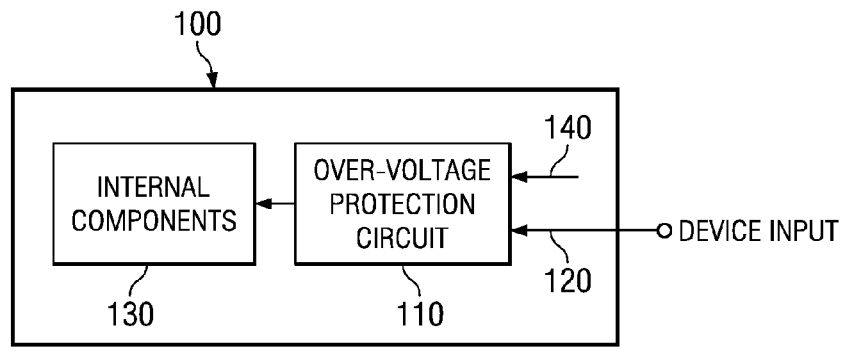
FIG. 1 is a block diagram of an example device including an example over-voltage protection circuit.

A block diagram of an example device 100 including an example over-voltage protection circuit 110 implementing the methods and/or apparatus described herein is illustrated in FIG. 1. The device 100 of the illustrated example further includes a device input 120 and one or more internal device components 130. The device input 120 is configured to allow one or more external accessories and/or components (not shown) to be coupled with the example device 100 and, more particularly, with the internal components 130. Although the example device 100 is depicted as having a single device input 120, other example implementations may include any number of device inputs 120 to enable any number of internal components 130 to be connected with any number of external accessories and/or components. As described in greater detail below, the example over-voltage protection circuit 110 is configured to isolate the device input 120 from the example internal device components 130 when any over-voltage condition occurs with respect to the device input 120. Furthermore, the example over-voltage protection circuit 110 is configured to provide over-voltage protection whether the example device 100 is active (e.g., powered ON), inactive (e.g., powered OFF) or in a sleep (e.g., low power) state.

The example device 100 may be any type of device having one or more device inputs 120 configured to connect with one or more external accessories, components, etc. Furthermore, the internal components 130 may be any type of internal components susceptible to damage from an over-voltage condition associated with the device input(s) 120. In an example implementation, the device 100 may be a device having audio and/or video functionality and, thus, the internal components 130 may be the corresponding audio and/or video components/circuitry implementing the audio and/or video functionality. Furthermore, in such an example implementation, the device input(s) 120 may be line input(s) 120 configured to couple external audio and/or video accessories, components, etc., to the respective audio and/or video internal components/circuitry 130. As such, the example device 100 could be implemented by any audio and/or video device, such as, for example, a mobile phone, a personal digital assistant (PDA), an MP3 player, a video display, a television, etc. The example device 100 may also be implemented using discrete components/circuitry, as an integrated circuit, etc.

The over-voltage protection circuit 110 included in the device 100 of the illustrated example is interposed between the internal components 130 and the device input 120 to protect the internal components 130 from an over-voltage condition associated with the device input 120. An over-voltage condition may correspond to, for example, a positive over-voltage condition associated with an excessive positive voltage on the device input 120, or a negative over-voltage condition associated with an excessive negative voltage on the device input 120. In an example implementation, the over-voltage protection circuit 110 is configured to isolate the device input 120 from the internal components 130 when a positive over-voltage condition or a negative over-voltage condition occurs on the device input 120. In an example implementation having more than one device input 120, the example device 100 may include one or more associated over-voltage protection circuits 110. For example, a separate over-voltage protection circuit 110 may be associated with each respective device input 120 for isolating that particular device input 120 from the internal components 130. Alternatively, one over-voltage protection circuit 110 may be associated with multiple device inputs 120 and may be configured to isolate all or a subset of the multiple device inputs 120 if an over-voltage condition is associated with any one of those device inputs 120.

The example over-voltage protection circuit 110 of FIG. 1 also includes a threshold input 140. The threshold input 140 of the illustrated example accepts a programmable threshold for use by the over-voltage protection circuit 110 to determine whether an over-voltage condition has occurred with respect to the device input 120. In particular, the example over-voltage protection circuit 110 is configured to compare the voltage at the device input 120 with the threshold provided by the threshold input 140 to determine whether the voltage at the device input 120 corresponds to an over-voltage condition. For example, the threshold input 140 may be configured to accept a single threshold for use in determining whether either a positive over-voltage or a negative over-voltage condition has occurred. In such an example implementation, the over-voltage protection circuit 110 compares the threshold with the magnitude of the voltage at the device input 120 and determines that an over-voltage condition has occurred when the magnitude exceeds the threshold.

In another example implementation, the threshold input 140 may be configured to accept a positive threshold for use in determining whether a positive over-voltage condition has occurred, and a negative threshold for determining whether a negative over-voltage condition has occurred. In such an example implementation, the over-voltage protection circuit 110 compares both the positive and negative thresholds with the voltage at the device input 120. The over-voltage protection circuit 110 then determines that a positive over-voltage condition has occurred when the voltage exceeds the positive threshold and that a negative over-voltage condition has occurred when the voltage is less than the negative voltage threshold. In yet another example implementation, the threshold input 140 could be configured to accept multiple thresholds. In such an example implementation, the over-voltage protection circuit 110 compares the multiple thresholds with the voltage at the device input 120 and takes different actions based which of the thresholds is exceeded.

The example over-voltage protection circuit 110 provides over-voltage protection for the example device 100 by isolating the device input 120 from the internal components 130. In an example implementation, the over-voltage protection circuit 110 uses an isolation switch to electrically isolate the device input 120 from the internal components 130 instead of directing the voltage associated with the device input 120 to ground via an active clamp circuit configuration when an over-voltage condition occurs. This allows the over-voltage protection circuit 110 of the illustrated example to provide over-voltage protection for the example device 100 when the device 100 is active (e.g., in an ON mode) as well as inactive (e.g., in an OFF mode) or in a low-power mode (e.g., a sleep mode). For example, to provide over-voltage protection in active as well as inactive or low-power modes, the example over-voltage protection circuit 110 uses the energy (e.g., the voltage) at the device input 120 to open the isolation switch to isolate the device input 120 from the internal components 130 when the over-voltage condition occurs. In this manner, the energy (e.g., voltage) provided by the device input 120 allows the example over-voltage protection circuit 110 to open the switch for isolating the internal components 130 even when no power (or limited power) is applied to the device 110.

In a further example implementation, the example over-voltage protection circuit 110 is configured to open the switch to isolate the internal components 130 by default when the device 100 is inactive or in a low-power mode. Additionally, the over-voltage protection circuit 110 in such an example implementation may be further configured to use the energy (e.g., voltage) at the device input 120 to maintain the switch in an open position to isolate the internal components 130 even when the voltage at the device input 120 is a negative value. In the absence of such a configured over-voltage protection circuit 110, a negative voltage applied to the device input 120 during an inactive or low power mode could result in a positive voltage drop across the control input of the isolation switch used to isolate the internal components 130. For example, the isolation switch interposed between the device input 120 and the internal components 130 may be configured to close when a voltage exceeding an activation threshold is applied to the switch's control input. When a negative voltage is applied to device input 120 during an inactive or low power mode, the voltage drop from the switch's unpowered control input to the device input 120 may become positive. If the example over-voltage protection circuit 110 were not configured to use the energy at the device input 120 to maintain the switch in an open position, such a positive voltage drop could cause the switch to inadvertently close, thereby exposing the internal components 130 to a possible negative over-voltage condition.

Conversely, a positive voltage applied to the device input 120 may result in a negative voltage drop across the control input of the isolation switch used to isolate the internal components 130. For example, when a positive voltage is applied to device input 120 during an inactive or low power mode, the voltage drop from the switch's un-powered control input to the device input 120 may become negative. Such a negative voltage drop may have no effect on the switch when the switch is configured to close only when a voltage above an activation threshold is applied to its control input. Thus, to prevent inadvertent closing of the isolation switch during, for example, inactive or low power modes, the over-voltage protection circuit 110 in the illustrated example is implemented to maintain the switch in an open position even when the voltage at the device input 120 is a negative value. However, because non-negative voltages applied to the device input 120 will not inadvertently close the isolation switch, the over-voltage protection circuit 110 in the illustrated example does not need to further affect the switch when the input voltage is not negative (i.e., not when the voltage at the device input 120 is greater than or equal to zero). Two example implementations providing this described functionality for the over-voltage protection circuit 110 are illustrated in FIGS. 2 and 3, which are discussed in greater detail below.

Figure 2:
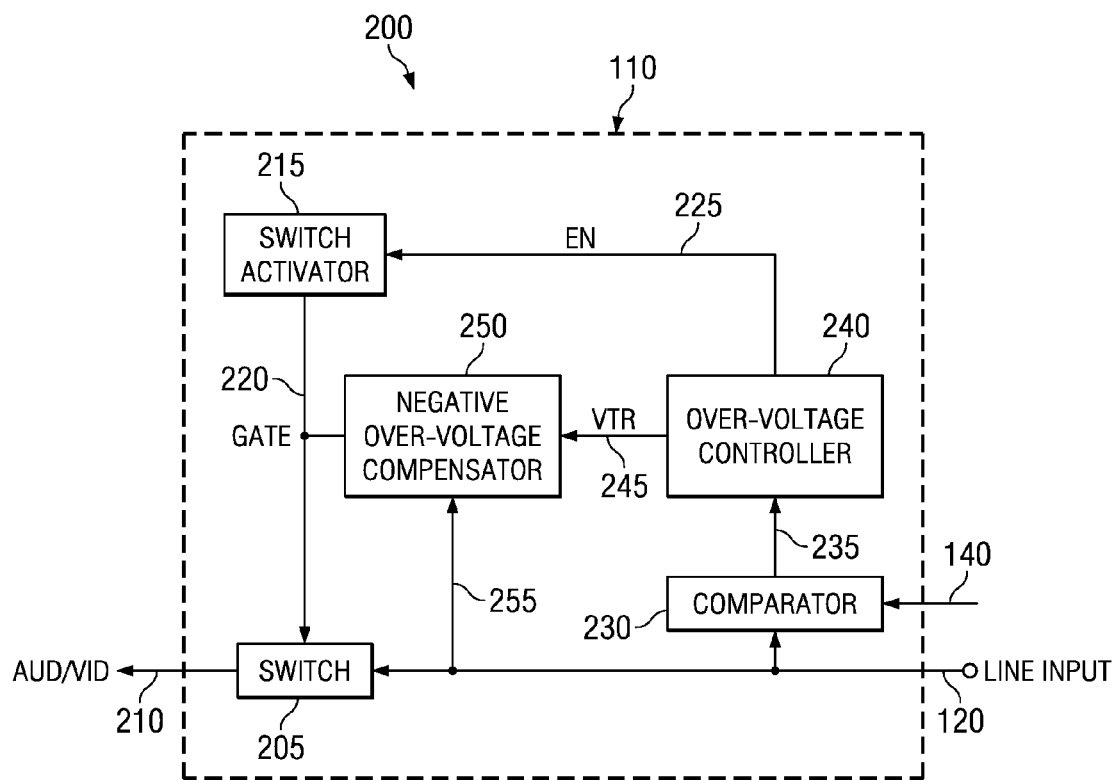
FIG. 2 is a block diagram illustrating a first example implementation of the example over-voltage protection circuit of FIG. 1.
Figure 3:
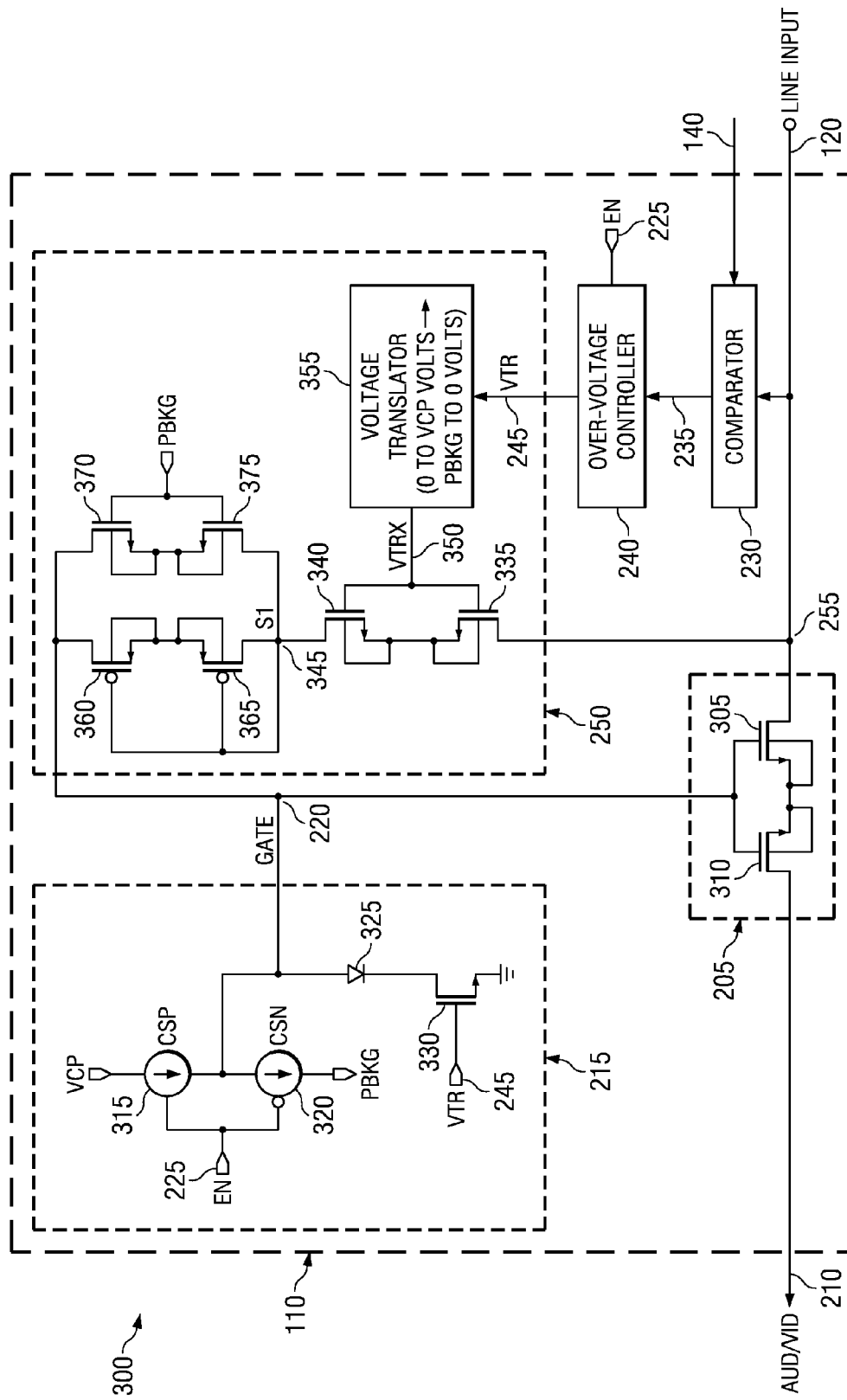
FIG. 3 is a block diagram illustrating a second example implementation of the example over-voltage protection circuit of FIG. 1.

A block diagram illustrating a first example implementation 200 of the example over-voltage protection circuit 110 of FIG. 1 is illustrated in FIG. 2. The example over-voltage protection circuit 110 of FIG. 2 includes an isolation switch 205 to isolate the device input 120 (e.g., such as a line input 120) during an over-voltage condition, as discussed above in connection with FIG. 1. The isolation switch 205 includes a switch output node 210 that is coupled to, for example, the internal components 130 (e.g., such as one or more audio/video components) of FIG. 1. Thus, when the isolation switch 205 is closed, the device input 120 is coupled to the switch output node 210 and, thus, is coupled to the internal components 130 of the example device 100. Conversely, when the isolation switch 205 is open, the device input 120 is isolated from the switch output node 210 and, thus, is isolated from the internal components 130 of the example device 100.

To control operation of the isolation switch 205, the example over-voltage protection circuit 110 of FIG. 2 includes a switch activator 215 coupled to a switch control node 220 of the isolation switch 205. (The switch control node 220 is labeled "GATE" in the example of FIG. 2.) The switch activator 215, in turn, is controlled by an enable node 225 (labeled "EN" in the example of FIG. 2). In the illustrated example, the isolation switch 205 is configured to close when a positive voltage (e.g., a positive voltage above an activation threshold) is applied to the switch control node 220, thereby coupling the device input 120 to the switch output node 210. Conversely, the isolation switch 205 is configured to open when a non-positive voltage (e.g., a voltage less than the activation threshold) is applied to the switch control node 220, thereby isolating the device input 120 from the switch output node 210. The switch activator 215, therefore, is configured to generate the appropriate isolation voltage at the switch control node 220 to close or open the isolation switch 205 according to the enable node 225. For example, the switch activator 215 may be configured to generate the positive voltage at the switch control node 220 to close the isolation switch 205 when the enable node 225 is a logical HIGH value (e.g., corresponding to a positive voltage). Furthermore, the switch activator 215 may be configured to generate the non-positive voltage at the switch control node 220 to open the isolation switch 205 when the enable node 225 is a logical LOW value (e.g., corresponding to a voltage substantially equal to zero).

In the illustrated example of FIG. 2, the enable node 225 is controlled based on the operation of a comparator 230. The comparator 230 uses the threshold input 140 discussed above in connection with FIG. 1 to determine whether an over-voltage condition is associated with the device input 120. For example, the comparator 230 accepts a threshold (e.g., a programmable threshold) applied to the threshold input 140 and compares the applied threshold to the voltage at the device input 120. For example, and as discussed above, the threshold input 140 may be configured to accept a single threshold and, thus, the comparator 230 determines that either a positive over-voltage or a negative over-voltage condition has occurred when the magnitude of the voltage at the device input 120 exceeds the threshold. In another example, and as discussed above, the threshold input 140 may be configured to accept a positive threshold for use in determining whether a positive over-voltage condition has occurred, and a negative threshold for determining whether a negative over-voltage condition has occurred. In such an example implementation, the comparator 230 compares both the positive and negative thresholds with the voltage at the device input 120. The comparator 230 then determines that a positive over-voltage condition has occurred when the voltage at the device input 120 exceeds the positive threshold, and that a negative over-voltage condition has occurred when the voltage at the device input 120 is less than the negative voltage threshold.

Based on its comparison of the voltage at the device input 120 with the threshold(s) applied to the threshold input 140, the comparator 230 generates a decision output 235 indicating whether an over-voltage condition has occurred. The decision output 235 is provided to an over-voltage controller 240 included in the example over-voltage protection circuit 110 of FIG. 2. The over-voltage controller 240 of the illustrated example is configured to generate control signals to enable or disable over-voltage protection in the example over-voltage protection circuit 110. For example, the over-voltage controller 240 generates an enable control signal for the enable node 225. In the illustrated example, the over-voltage controller 240 sets the enable control signal for the enable node 225 to a logical HIGH value when no over-voltage condition is indicated by the decision output 235, and to a logical LOW value when an over-voltage condition (e.g., a positive or negative over-voltage condition) is indicated by the decision output 235.

Additionally, the over-voltage controller 240 of the illustrated example generates an over-voltage transient signal for an over-voltage transient node 245 (labeled "VTR" in the example of FIG. 2). The over-voltage transient node 245 acts as an input to a negative over-voltage compensator 250 included in the example over-voltage protection circuit 110. The negative over-voltage compensator 250 improves the switching time of the isolation switch 205, especially when a negative over-voltage condition is associated with the device input 120. As discussed above, the isolation switch 205 is configured to close when a positive voltage (e.g., a positive voltage above an activation threshold) is applied to the switch control node 220, and to open when a non-positive voltage (e.g., a voltage less than the activation threshold) is applied to the switch control node 220. As discussed in greater detail below, the negative over-voltage compensator 250 improves the switching time of the isolation switch 205 by quickly pulling the switch control node 220 all the way to a non-positive voltage (e.g., a voltage less than the activation threshold) even when a negative voltage is applied to the device input 120.

In an example implementation, the operative voltage at the switch control node 220 is referenced to the voltage at the device input 120. Thus, when the voltage at the device input 120 corresponds to normal operation in which there is no over-voltage condition, a logical HIGH voltage is applied to the switch control node 220 (corresponding to the enable node 225 being set to a logical LOW value) to close the isolation switch 205 (assuming that the logical HIGH voltage is designed to be larger than the largest voltage expected during normal operation). Then, when an over-voltage condition on the device input 120 is detected by the comparator 230 and indicated by the detection output 235, the over-voltage controller 240 sets the enable node 225 to a logical LOW value. The logical LOW value at the enable node 225, in turn, causes the switch control node 220 to transition to a voltage substantial equal to 0 volts (e.g., the ground potential). If the over-voltage condition corresponds to a positive over-voltage condition on the device input 120, the voltage at the switch control node 220 will be non-positive (negative in this case) relative to the device input 120 and, thus, the isolation switch 205 will be opened to disconnect the internal components 130 from the device input 120.

However, if the over-voltage condition corresponds to a negative over-voltage condition on the device input 120, the substantially 0 volts at the switch control node 220 will still result in a positive voltage drop from the switch control node 220 to the device input 120, which by itself would be insufficient to open the isolation switch 205. Therefore, the example over-voltage protection circuit 110 of FIG. 2 includes the negative over-voltage compensator 250 to provide additional control for the isolation switch 205 in the case of a negative over-voltage condition associated with the device input 120. In the illustrated example, when the over-voltage transient node 245 indicates that a negative over-voltage condition has occurred, the negative over-voltage compensator 250 is configured to pull the voltage at the switch control node 220 down to the voltage of the device input 120. The voltage of the device input 120 is, therefore, provided as an input to the example negative over-voltage compensator 250 via a device input node 255. By pulling the voltage at the switch control node 220 down to the voltage of the device input 120 during a negative over-voltage condition, the voltage drop from the switch control node 220 to the voltage of the device input 120 will be non-positive (e.g., substantially zero in this case), thereby allowing the isolation switch 205 to open and isolate the device input 120 from the switch output node 210.

The example negative over-voltage compensator 250 also provides enhanced over-voltage protection when the example over-voltage protection circuit 110 of FIG. 2 is inactive or in a low-power mode. In an example implementation, the voltages at the internal nodes of the over-voltage protection circuit 110, and in particular the switch control node 220 and the enable node 225, default to substantially 0 volts (e.g., the ground potential). As such, the isolation switch 205 defaults to open, thereby isolating the device input 120 from the switch output node 210. If a positive voltage is applied to the device input 120, the isolation switch 205 remains open because the voltage drop from the switch control node 220 to the device input 120 will remain non-positive (e.g., will be negative in this case). However, if a negative voltage is applied to the device input 120, the voltage drop from the switch control node 220 to the device input 120 could start to go positive, and could allow the isolation switch 205 to close and expose the internal components 130 (not shown) coupled to the switch output node 210 to potentially damaging negative voltages.

To maintain the isolation switch 205 in an open position even in the presence of negative voltages applied to the device input 120, the example negative over-voltage compensator 250 uses the energy (e.g., the voltage) at the device input node 255 and provided by the device input 120 to control the switch control node 220. In particular, the example negative over-voltage compensator 250 uses the energy (e.g., the voltage) at the device input node 255 to pull the voltage at the switch control node 220 down to the negative voltage of the device input 120. In this way, the voltage drop from the switch control node 220 to the device input 120 remains non-positive (e.g., substantially zero in this case), thereby keeping the isolation switch 205 open. Thus, the energy (e.g., voltage) provided by the device input 120 via the device input node 255 allows the example negative over-voltage compensator 250 to open the isolation switch 205 and protect the components/circuitry coupled to the switch output node 210 even when no power (or limited power) is applied to the example over-voltage protection circuit 110 of FIG. 2.

A block diagram illustrating a second example implementation 300 of the example over-voltage protection circuit 110 of FIG. 1 is illustrated in FIG. 3. In particular, the second example implementation 300 of FIG. 3 illustrates particular example implementations of the isolation switch 205, the switch activator 215 and the negative over-voltage compensator 250 included in the first example implementation 200 of the over-voltage protection circuit 110 illustrated in FIG. 2. The second example implementation 300 includes many elements in common with the first example implementation network 200 of the over-voltage protection circuit 110. As such, like elements in FIGS. 2 and 3 are labeled with the same reference numerals. For brevity, the detailed descriptions of these like elements are provided above in connection with the discussion of FIG. 2 and, therefore, are not repeated in the discussion of FIG. 3.

As in the first example implementation 200 of FIG. 2, the second example implementation 300 of the example over-voltage protection circuit 110 includes the isolation switch 205 to isolate the device input 120 (e.g., such as a line input 120) from the switch output node 210 during an over-voltage condition. In the illustrated example of FIG. 3, the example isolation switch 205 is implemented using a pair of N-channel field effect transistors (N-FETs) 305 and 310. The drain of the N-FET 305 is coupled to the device input 120 (e.g., via the device input node 255), the drain of the N-FET 310 is coupled to the switch output node 210, and the source nodes of the N-FETs 305 and 310 are coupled together. Additionally, the gate nodes of the N-FETs 305 and 310 are coupled together and form the switch control node 220 as shown. Thus, the voltage applied to the switch control node 220 closes the isolation switch 205 when the voltage drop from the gate nodes of the N-FETs 305 and 310 is positive relative to the voltage at the device input 120, thereby turning ON the N-FETs 305 and 310. Conversely, the voltage applied to the switch control node 220 opens the isolation switch 205 when the voltage drop from the gate nodes of the N-FETs 305 and 310 is non-positive (e.g., less than or equal to zero) relative to the voltage at the device input 120, thereby turning OFF the N-FETs 305 and 310.

The second example implementation 300 of the example over-voltage protection circuit 110 also includes the switch activator 215 to generate the appropriate voltage at the switch control node 220 to close or open the isolation 205 according to the voltage at the enable node 225. In the illustrated example of FIG. 3, the example switch activator 215 is implemented using a positive current source 315 and a negative current source 320 controlled via the enable node 225 as shown. The source of the positive current source 315 and the sink of the negative current source 320 are coupled together and to the switch control node 220. Additionally, the example switch activator 215 of FIG. 3 includes a diode 325 and N-FET 330 coupled in series to the switch control node 220 as shown. The gate node of the N-FET 330 is controlled via the voltage at the over-voltage transient node 245 as discussed below.

An example operation of the example switch activator 215 is as follows. To close the isolation switch 205, the enable node 225 is set to a logical HIGH value by the over-voltage controller 240. Additionally, the voltage at the over-voltage transient node 245 is set to a logical LOW value by the over-voltage controller 240 because no over-voltage condition has been detected. A logical HIGH value at the enable node 225 causes the positive current source 315 to turn ON and the negative current source 320 to turn OFF, thereby pulling the voltage at the switch control node 220 up to the source voltage of the positive current source 315. Furthermore, the logical LOW value at the input to the N-FET 330 turns the N-FET 330 OFF, thereby allowing the switch control node 220 to be pulled up by the positive current source 315. In the illustrated example, the source voltage of the positive current source 315 is substantially equal to a positive charge pump voltage (labeled "VCP" in the example of FIG. 3) powering the example device 100. The resulting positive charge pump voltage VCP at the switch control node 220 causes the pair of N-FETs 305 and 310 to turn ON and couple the device input 120 to the switch output node 210, thereby closing the isolation switch 205.

Conversely, to open the isolation switch 205, the enable node 225 is set to a logical LOW value and the over-voltage transient node 245 is set to a logical HIGH value by the over-voltage controller 240 in response to an over-voltage condition. A logical LOW value at the enable node 225 causes the negative current source 320 to turn ON and the positive current source 315 to turn OFF, thereby pulling the voltage at the switch control node 220 down towards the sink voltage of the negative current source 320. In the illustrated example, the sink voltage of the negative current source 320 is substantially equal to a negative charge pump voltage (labeled "PBKG" in the example of FIG. 3) that pumps the substrate of the example device 100 below the ground potential and to a negative voltage lower than the largest negative voltage that could be applied to the device input 120.

Additionally, the logical HIGH value at the over-voltage transient node 245 causes the N-FET 330 to turn ON, thereby pulling the switch control node 220 to ground through the diode 325 more quickly than through use of the negative current source 320 alone. The resulting ground voltage, and later the resulting negative charge pump voltage (e.g., substrate voltage) at the switch control node 220 causes the pair of N-FETs 305 and 310 to turn OFF and isolate the device input 120 from the switch output node 210, thereby opening the isolation switch 205.

In the case of a positive over-voltage condition on the device input 120, the pulling down of the switch control node 220 to ground through the combination of the diode 325 and the N-FET 330 is sufficient to turn OFF the pair of N-FETs 305 and 310 and quickly open the isolation switch 205. This is because the voltage drop from the switch control node 220 to the device input 120 will be non-positive (e.g., negative in this case) when the switch control node 220 is at ground and the device input 120 is experiencing a positive over-voltage condition. However, in the case of a negative over-voltage condition, the voltage from the switch control node 220 to the device input 120 will still be positive when the switch control node 220 is pulled to ground. Thus, the combination of the diode 325 and the N-FET 330 is insufficient to provide quick turn OFF of the pair of N-FETs 305 and 310 during a negative over-voltage condition. Instead, the second example implementation 200 of the over-voltage protection circuit 110 also includes the negative over-voltage compensator 250 to improve the switching time of the isolation switch 205 during negative over-voltage conditions.

In the illustrated example of FIG. 3, the negative over-voltage compensator 250 includes a pair of N-FETs 335 and 340 to accept the voltage applied by the device input 120 to the device input node 255. In particular, the drain node of the N-FET 335 is coupled to the device input node 255, the drain node of the N-FET 340 is coupled to an intermediate node 345 (labeled "S1" in the example of FIG. 3), and the source nodes of the N-FETs 335 and 340 are coupled together. Additionally, the gate nodes of the N-FETs 335 and 340 are coupled together and form a translated over-voltage transient node 350. The voltage applied to the translated over-voltage transient node 350 is generated by a voltage translator 355 configured to translate a first range of voltages associated with the over-voltage transient node 245 to a second range of voltages at the translated over-voltage transient node 350. In the illustrated example, the over-voltage transient node 245 can have a range of voltages from 0 volts to VCP volts. The example voltage translator 355 translates this first range of voltages to a second range of voltages from PBKG volts to 0 volts. In other words, the voltage translator 355 of the illustrated example maps a voltage of 0 volts at the over-voltage transient node 245 to a voltage of PBKG volts at the translated over-voltage transient node 350, and VCP volts at the over-voltage transient node 245 to a voltage of 0 volts at the translated over-voltage transient node 350. As discussed above, the voltage VCP is the voltage powering the example device 100, and the voltage PBKG is a negative voltage lower than the largest negative voltage that could be applied to the device input 120. In an example implementation, VCP could be approximately +2.5 volts and PBKG could be approximately −10 volts.

As discussed above, when an over-voltage condition has not occurred, the over-voltage controller 240 will set the over-voltage transient node 245 to, for example, 0 volts. The voltage translator 355 will translate the 0 volts at the over-voltage transient node 245 to PBKG volts at the translated over-voltage transient node 350. Because the voltage PBKG is lower than any voltage that could be applied to the device input 120, the pair of N-FETs 335 and 340 will remain OFF regardless of the voltage applied to the device input node 255. However, when an over-voltage condition is detected, the over-voltage controller 240 will set the over-voltage transient node 245 to, for example, VCP volts. The voltage translator 355 will translate the VCP volts at the over-voltage transient node 245 to 0 volts at the translated over-voltage transient node 350. In the case of a positive over-voltage condition, the voltage at the device input node 255 will be greater than the 0 volts at the translated over-voltage transient node 350, thereby causing the pair of N-FETs 335 and 340 to remain OFF. However, in the case of a negative over-voltage condition, the voltage at the device input node 255 will be negative. The resulting positive voltage drop from the 0 volts at the translated over-voltage transient node 350 to the negative voltage at the device input node 255 will cause the pair of N-FETs 335 and 340 to turn ON and pull the intermediate node 345 to the voltage at the device input node 255 and, therefore, the device input 120.

Coupled to the intermediate node 345 is a pair of P-channel field effect transistors (P-FETs) 360 and 365 arranged in a diode configuration. In the illustrated example, the "anode" of the diode-configured P-FETs 360/365 is coupled to the switch control node 220, and the "cathode" of the diode-configured P-FETs 360/365 is coupled to the intermediate node 345. In the case of no over-voltage condition or a positive over-voltage condition, the pair of N-FETs 335 and 340 are closed and no current flows through the diode-configured P-FETs 360/365. However, during a negative over-voltage condition, the N-FETs 335 and 340 turn ON and pull the intermediate node 345 to the negative voltage at the device input node 255, causing the diode-configured P-FETs 360/365 to be forward biased. Because the P-FETs 360/365 are now forward biased, the switch control node 220 will be pulled down to the negative voltage at the device input node 255 and, therefore, the voltage of the device input 120. Thus, the combination of the pair of N-FETs 335/340 and the diode-configured P-FETs 360/365 causes the switch control node 220 to be pulled quickly to the negative voltage of the device input 120 during a negative over-voltage condition. This pulling down of the switch control node 220 to the voltage at the device input through the combination of the pair of N-FETs 335/340, and the diode-configured P-FETs 360/365 is sufficient to turn OFF the pair of N-FETs 305 and 310 and quickly open the isolation switch 205.

In the foregoing description, the example device 100 was assumed to be active such that, for example, a positive charge pump was providing the voltage VCP and a negative charge pump was providing the voltage PBKG. The second example implementation 300 of the over-voltage protection circuit 110 also provides over-voltage protection when the example device 100 is inactive or in a low-power (e.g., sleep) mode. In an example implementation of an inactive or low-power mode, the positive and negative charge pumps are disabled and, thus, both VCP and PBKG will be approximately equal to 0 volts (e.g., the ground potential). As a result, the voltages at the internal nodes of the over-voltage protection circuit 110, and in particular the switch control node 220, the enable node 225, the over-voltage transient node 245 and the translated over-voltage transient node 350, default to substantially 0 volts. In the illustrated example, a voltage substantially equal to 0 at the switch control node 220 will cause the pair of N-FETs to turn OFF and open the isolation switch 205 when a positive voltage is applied to the device input 120. This is because the voltage drop from the switch control node 220 to the device input 120 will be non-positive (e.g., negative) in this case. However, when a negative voltage is applied to the device input 120 the voltage drop from the switch control node 220 to the device input 120 could start to go positive and, therefore, could allow the pair of N-FETs to inadvertently turn ON and close the isolation switch 205. This could expose the switch output node 210 to potentially dangerous negative voltages while the example device 110 is in an inactive or low-power mode.

However, the implementation of the example negative over-voltage compensator 250 illustrated in FIG. 3 also protects against negative voltages and negative over-voltage conditions associated with the device input 120 when the example device 110 is in an inactive or low-power mode. For example, when the example device 110 is in an inactive or low-power mode, the voltage at the translated over-voltage transient node 350 will default to approximately 0 volts. When a positive voltage is applied to the device input 120, the pair of N-FETs 335 and 340 will remain OFF because the translated over-voltage transient node 350 is less than the voltage at the device input node 255.

However, when a negative voltage is applied to the device input 120, the pair of N-FETs 335 and 340 will turn ON because the translated over-voltage transient node 350 is greater than the voltage at the device input node 255. The turning ON of the pair of N-FETs 335 and 340 will pull the voltage at the intermediate node 345 to the negative voltage at the device input node 255, further causing the diode-configured P-FETs 360/365 to become forward biased. The diode-configured P-FETs 360/365 become forward biased because the voltage at the switch control node 220 defaults to approximately 0 volts when the example device 100 is initially inactive or in a low-power mode. The combination of the diode-configured P-FETs 360/365 becoming forward biased and the pair of N-FETs 335 and 340 turning ON causes the voltage at the switch control node 220 to be pulled to the negative voltage at the device input node 255. This limits the voltage drop from the switch control node 220 to the device input 120 to a nominal value insufficient to turn ON the pair of N-FETs 305 and 310, thereby maintaining the isolation provided by the isolation switch 205 during inactive or low-power modes.

To prevent the switch control node 220 from being pulled to excessively negative values during inactive or low-power operation, the negative over-voltage compensator 250 of the illustrated example also includes a pair of bleed-off N-FETs 370 and 375 as shown. During active operation, the negative charge pump is active and drives PBKG to a voltage lower than any negative voltage that will appear on the device input 120. As such, because PBKG is coupled to the gate nodes of the bleed-off N-FETs 370 and 375, this pair of transistors will not turn ON during active operation. However, during inactive or low-power operation, the negative charge pump is disabled and the voltage PBKG becomes approximately equal to 0 volts. Therefore, when a negative voltage is applied to the device input 120 and the voltage at the intermediate node 345 is pulled down by the pair of N-FETs 335 and 340, the pair of bleed-off N-FETs 370 and 375 also turn ON and provide a low resistance path from the intermediate node 345 to the switch control node 220.

Without the pair of bleed-off N-FETs 370 and 375, once the switch control node 220 was pulled down to a large negative voltage by the diode-configured P-FETs 360/365 and the pair of N-FETs 335 and 340, the voltage at the switch node 220 would be prevented from returning to a less negative, or zero, voltage afterward because the diode-configured P-FETs 360/365 would be reverse-biased. However, with the pair of bleed-off N-FETs 370 and 375, a low resistance path from the intermediate node 345 to the switch control node 220 is provided even when the diode-configured P-FETs 360/365 are reverse biased. This low resistance path through the pair of bleed-off N-FETs 370 and 375 allows the voltage at the switch control node 220 to return to a less negative, or zero, voltage after a larger negative voltage is removed from the device input 120. This feature protects the switch control node 220 from being pulled to excessively negative, and potentially dangerous, values during inactive or low-power operation.

Figure 4:
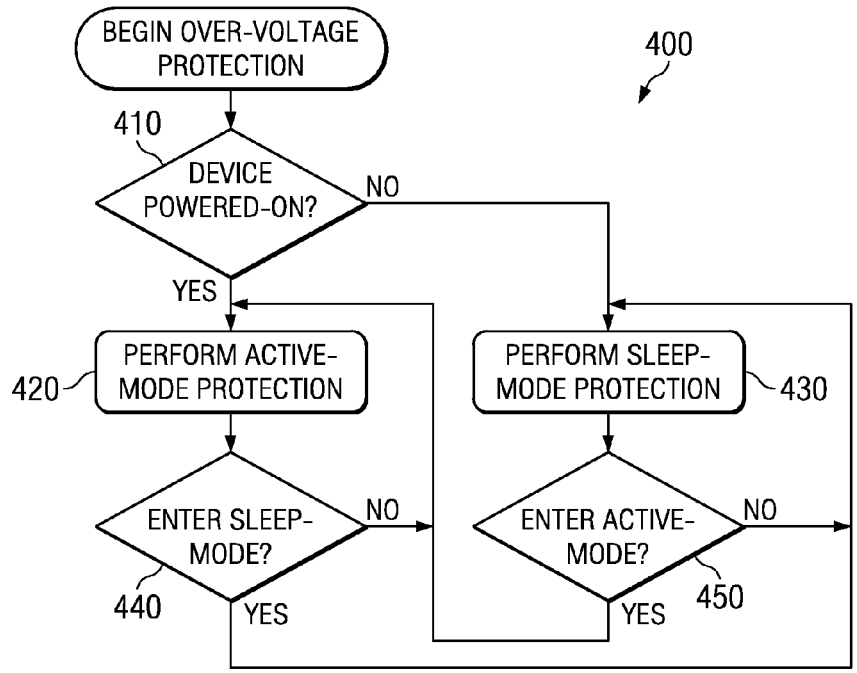
FIG. 4 is a flowchart representative of an example over-voltage protection process that may be implemented by the example over-voltage protection circuits of FIGS. 1, 2 and/or 3
Figure 5:
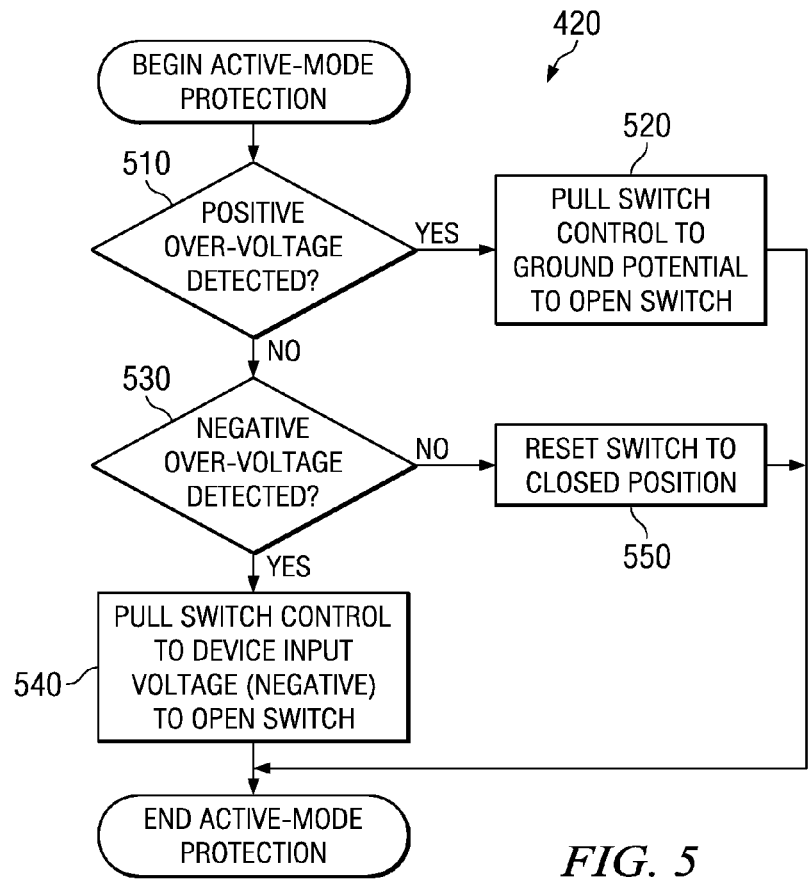
FIG. 5 is a flowchart representative of an example active-mode over-voltage protection process that may be performed to implement a portion of the example over-voltage protection process of FIG. 4.
Figure 6:
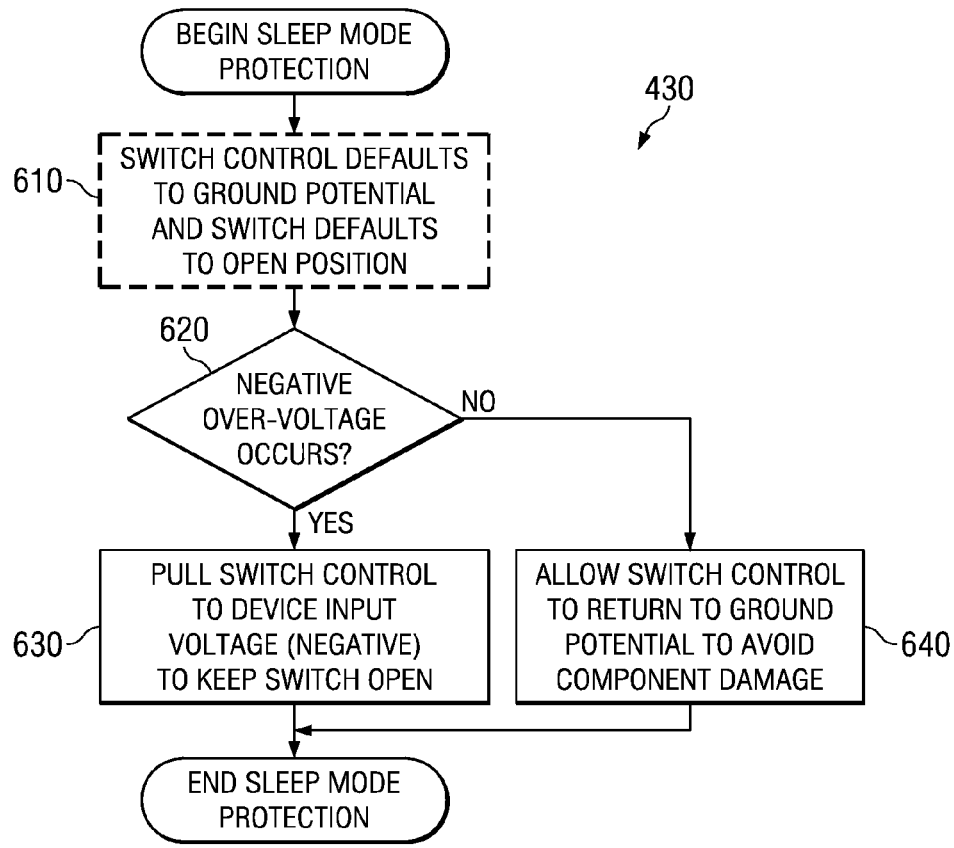
FIG. 6 is a flowchart representative of an example sleep-mode over-voltage protection process that may be performed to implement a portion of the example over-voltage protection process of FIG. 4.

Flowcharts representative of example processes that may be implemented by all, or at least portions of the example device 100, the example over-voltage protection circuit 110, the example isolation switch 205, the example switch activator 215, the example comparator 230, the example over-voltage controller 240, the example negative over-voltage compensator 250 and/or the example voltage translator 355 are shown in FIGS. 4-6. Additionally or alternatively, any, all or portions thereof of the example device 100, the example over-voltage protection circuit 110, the example isolation switch 205, the example switch activator 215, the example comparator 230, the example over-voltage controller 240, the example negative over-voltage compensator 250, the example voltage translator 355, and/or the example processes represented by the flowcharts of FIGS. 4-5 and/or 6 could be implemented by any combination of software, firmware, hardware devices and/or combinational logic, other circuitry, etc., such as the hardware circuitry and transistors, etc., shown in FIGS. 1-3. Furthermore, the process represented by each flowchart may be implemented by one or more programs comprising machine readable instructions for execution by: (a) a processor, such as the processor 712 shown in the example system 700 discussed below in connection with FIG. 7, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 712, but persons of ordinary skill in the art will readily appreciate that the entire program or programs and/or portions thereof could alternatively be executed by a device other than the processor 712 and/or embodied in firmware or dedicated hardware (e.g., implemented by an application specific integrated circuit (ASIC), a programmable logic device (PLD), a field programmable logic device (FPLD), discrete logic, etc.). Also, some or all of the processes represented by the flowcharts of FIGS. 4-6 may be implemented manually. Further, although the example processes are described with reference to the flowcharts illustrated in FIGS. 4-6, persons of ordinary skill in the art will readily appreciate that many other techniques for implementing the example methods and apparatus described herein may alternatively be used. For example, with reference to the flowcharts illustrated in FIGS. 4-6, the order of execution of the blocks may be changed, and/or some of the blocks described may be changed, eliminated, combined and/or subdivided into multiple blocks.

An example over-voltage protection process 400 that may be executed to implement the example over-voltage protection circuit 110 of FIGS. 1, 2 and/or 3 is illustrated in FIG. 4. The example over-voltage protection process 400 may be executed, for example, automatically upon implementation of the example device 100 of FIG. 1, upon activation of the example device 100, upon the example device 100 entering an inactive or a low power (e.g., sleep) mode, etc. Referring also to FIGS. 2 and 3, execution of the example over-voltage protection process 400 of FIG. 4 begins at block 410 at which control proceeds to block 420 if the example device 100 is in an active mode (e.g., powered ON) or to block 430 if the example device 100 is in a sleep mode (e.g., powered OFF, in a low power mode, etc.). At block 420, the example over-voltage protection circuit 110 performs an active-mode over-voltage protection process to protect the example device 100 from an over-voltage condition associated with, for example, the example device input 120. An example active-mode over-voltage protection process to implement the processing at block 420 is illustrated in FIG. 5 and discussed in greater detail below. After processing completes at block 420, control proceeds to block 440. At block 440, if the example device 100 is still in the active mode (e.g., powered ON), control returns to block 420 at which the example over-voltage protection circuit 110 continues to perform the active-mode over-voltage protection process to protect the example device 100 from an over-voltage condition associated with the example device input 120. However, if the example device 100 has entered the sleep mode (e.g., powered OFF or in the low power mode, etc.), control proceeds to block 430.

At block 430, the example over-voltage protection circuit 110 performs a sleep-mode over-voltage protection process to protect the example device 100 from an over-voltage condition associated with, for example, the example device input 120. An example sleep-mode over-voltage protection process to implement the processing at block 430 is illustrated in FIG. 6 and discussed in greater detail below. After processing completes at block 430, control proceeds to block 450. At block 450, if the example device 100 is still in the sleep mode (e.g., powered OFF, the low power mode, etc.), control returns to block 430 at which the example over-voltage protection circuit 110 continues to perform the sleep-mode over-voltage protection process to protect the example device 100 from an over-voltage condition associated with the example device input 120. However, if the example device 100 has entered the active mode (e.g., powered ON), control proceeds to block 420.

An example active-mode over-voltage protection process 420 that may be executed to perform the processing at block 420 of FIG. 4 and/or to implement the example over-voltage protection circuit 110 of FIGS. 1, 2 and/or 3 is illustrated in FIG. 5. Referring also to FIGS. 2 and 3, execution of the example active-mode over-voltage protection process 420 of FIG. 5 begins at block 510 at which the example over-voltage protection circuit 110 detects whether a positive over-voltage condition has occurred with respect to, for example, the device input 120 of the example device 100. For example, at block 510 the comparator 230 included in the example over-voltage protection circuit 110 may compare the voltage at the device input 120 to a programmable threshold applied to the threshold input 140 to determine whether the voltage at the device input 120 corresponds to a positive over-voltage condition.

If a positive over-voltage condition is detected (block 510), control proceeds to block 520 at which the example over-voltage protection circuit 110 pulls the switch control node 220 of the isolation switch 205 included in the over-voltage protection circuit 110 to ground to open the isolation switch 205 and isolate the device input 120 from any internal components 130 coupled to the switch output node 210. For example, and referring to the example implementation 300 of FIG. 3, at block 520 the enable node 225 is set to a logical LOW value and the over-voltage transient node 245 is set to a logical HIGH value by the over-voltage controller 240 in response to the positive over-voltage condition. The logical LOW value at the enable node 225 causes the negative current source 320 to turn ON and pull the voltage at the switch control node 220 down towards the voltage PBKG. Furthermore, the logical HIGH value at the over-voltage transient node 245 causes the N-FET 330 to turn ON, thereby quickly pulling the switch control node 220 to ground. With the switch control node 220 at ground and a positive over-voltage condition at the device input 120, the pair of N-FETs 305 and 310 turn OFF and isolate the device input 120 from the switch output node 210, thereby opening the isolation switch 205. Then, after processing at block 510 completes, execution of the example process 420 ends.

If, however, a positive over-voltage condition is not detected (block 510), control proceeds to block 530 at which the example over-voltage protection circuit 110 detects whether a negative over-voltage condition has occurred with respect to, for example, the device input 120 of the example device 100. For example, at block 530 the comparator 230 included in the example over-voltage protection circuit 110 may compare the voltage at the device input 120 to a programmable threshold applied to the threshold input 140 to determine whether the voltage at the device input 120 corresponds to a negative over-voltage condition. If a negative over-voltage condition is detected (block 530), control proceeds to block 540 at which the example over-voltage protection circuit 110 pulls the switch control node 220 of the isolation switch 205 included in the over-voltage protection circuit 110 to the negative voltage of the device input 120 to open the isolation switch 205 and isolate the device input 120 from any internal components 130 coupled to the switch output node 210.

For example, and referring to the example implementation 300 of FIG. 3, at block 530 the enable node 225 is set to a logical LOW value and the over-voltage transient node 245 is set to a logical HIGH value by the over-voltage controller 240 in response to the negative over-voltage condition. Additionally, the voltage translator 355 will translate the logical HIGH value (e.g., VCP volts) at the over-voltage transient node 245 to 0 volts at the translated over-voltage transient node 350. The 0 volts at the translated over-voltage transient node 350, coupled with the negative over-voltage condition on the device input 120, causes the pair of N-FETs 335 and 340 to turn ON and the diode-configured P-FETs 360/365 to become forward-biased. The combination of the pair of N-FETs 335/340 being ON and the diode-configured P-FETs 360/365 being forward biased causes the switch control node 220 to be pulled quickly to the negative voltage of the device input 120 during a negative over-voltage condition. This, in turn, causes the switch control node 220 to turn OFF the pair of N-FETs 305 and 310 and quickly open the isolation switch 205. Then, after processing at block 540 completes, execution of the example process 420 ends.

If, however, a negative over-voltage condition is not detected (block 530), control proceeds to block 550. At block 550, the example over-voltage protection circuit 110 closes the isolation switch 205 because no over-voltage condition has been detected. The closed isolation switch 205 allows the device input 120 to be coupled to the example internal components 130 via the switch output node 210. For example, and referring to the example implementation 300 of FIG. 3, at block 550 the enable node 225 is set to a logical HIGH value and the over-voltage transient node 245 is set to a logical LOW value by the over-voltage controller 240 in response to no over-voltage condition being detected by the comparator 230. A logical HIGH value at the enable node 225 causes the positive current source 315 to turn ON and pull the voltage at the switch control node 220 up to the source voltage of the positive current source 315. The resulting positive voltage at the switch control node 220 causes the pair of N-FETs 305 and 310 to turn ON and couple the device input 120 to the switch output node 210, thereby closing the isolation switch 205. Then, after processing at block 550 completes, execution of the example process 420 ends.

An example sleep-mode over-voltage protection process 430 that may be executed to perform the processing at block 430 of FIG. 5 and/or to implement the example over-voltage protection circuit 110 of FIGS. 1, 2 and/or 3 is illustrated in FIG. 6. Referring also to FIGS. 2 and 3, before execution of example sleep-mode over-voltage protection process 430 of FIG. 6 begins, a default operation occurs at block 610 which does not require any process execution (e.g., the default operation at block 610 is indicated by the dotted lines to distinguish it from other blocks associated with process execution). At block 610, the example device 100 is disabled and, thus, the voltages at the internal nodes of the over-voltage protection circuit 110, and in particular the switch control node 220, the enable node 225, the over-voltage transient node 245 and the translated over-voltage transient node 350, default to substantially 0 volts. Then, execution of the example sleep-mode over-voltage protection process 430 of FIG. 6 begins at block 620.

At block 620, a negative over-voltage condition associated with for example, the device input 120 of the example device 100 causes control to proceeds to block 630. In an example implementation, during sleep mode processing, a negative over-voltage condition is said to occur when any increased negative voltage is applied to the device input 120. If a negative over-voltage condition occurs (block 620), control proceeds to block 630 at which the over-voltage protection circuit 110 pulls the switch control node 220 of the isolation switch 205 to the negative voltage of the device input 120 to maintain the isolation switch 205 in an open configuration, thereby isolating the device input 120 from any internal components 130 coupled to the switch output node 210. For example, and referring to the example implementation 300 of FIG. 3, at block 630, when the example device 100 is inactive or in a sleep mode, a negative voltage applied to the device input 120 will cause the pair of N-FETs 335 and 340 to turn ON and the diode-configured P-FETs 360/365 to become forward biased. The combination of the pair of N-FETs 335/340 being ON and the diode-configured P-FETs 360/365 being forward biased causes the switch control node 220 to be pulled quickly to the negative voltage of the device input 120. This, in turn, cause the switch control node 220 to maintain the pair of N-FETs 305 and 310 in an OFF state and, thereby, keep open the isolation switch 205. Then, after processing at block 630 completes, execution of the example process 420 ends.

If, however, a negative over-voltage condition does not occur (block 620), control proceeds to block 640. At block 640, because a negative over-voltage condition has not occurred, the voltage associated with the device input 120 must have lessened from its previous increased negative voltage. Thus, at block 640 the over-voltage protection circuit 110 allows the voltage at the switch control node 220 to return to a less negative, or zero, voltage after the greater negative voltage corresponding to the negative over-voltage condition is removed from the device input 120. For example, and referring to the example implementation 300 of FIG. 3, at block 640 the pair of bleed-off N-FETs 370 and 375 provide a low resistance path from the intermediate node 345 to the switch control node 220 even when the diode-configured P-FETs 360/365 are reverse biased. This low resistance path through the pair of bleed-off N-FETs 370 and 375 allows the voltage at the switch control node 220 to return to a less negative, or zero, voltage after a greater negative voltage is removed from the device input 120. Then, after processing at block 630 completes, execution of the example process 420 ends.

Figure 7:
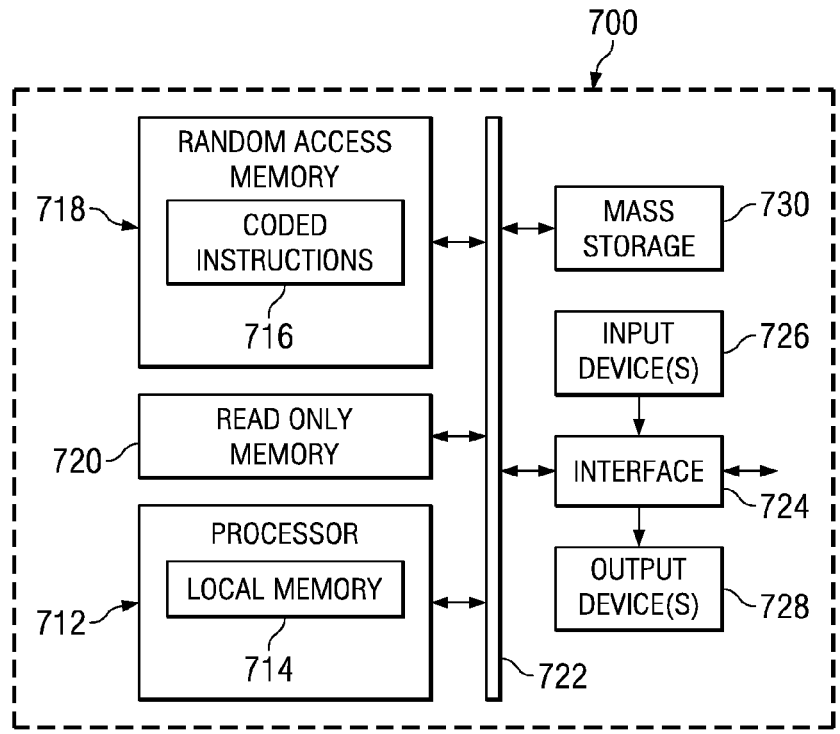
FIG. 7 is a block diagram of an example computer that may execute example machine readable instructions to implement some or all of the processes of FIGS. 4, 5 and/or 6 to implement the example over-voltage protection methods and/or apparatus described herein.

FIG. 7 is a block diagram of an example system 700 capable of implementing the apparatus and methods disclosed herein. Additionally, the system 700 may be used to implement the example device 100 of FIG. 1. The system 700 can be, for example, a server, a personal computer, a personal digital assistant (PDA), an Internet appliance, a DVD player, a CD player, a digital video recorder, a personal video recorder, a set top box, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, machine readable instructions to implement some or all of the processes represented in FIGS. 4-5 and/or 6. The processor 712 may be any type of processing unit, such as one or more microprocessors from the Texas Instruments OMAP® family of microprocessors. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The system 700 also includes an interface circuit 724. The interface circuit 724 may be implemented by any type of interface standard, such as an Ethernet interface, a universal serial bus (USB), and/or a third generation input/output (3GIO) interface. In an example implementation of the example device 100 based on the example system 700, the interface circuit 724 may also implement an interface between the example device input 120 and the example internal components 130 and, therefore, include the example over-voltage protection circuit 110.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The system 700 also includes one or more mass storage devices 730 for storing software and data. Examples of such mass storage devices 730 include floppy disk drives, hard drive disks, compact disk drives and digital versatile disk (DVD) drives. The mass storage device 730 may be used to store machine readable instructions to implement some or all of the example processes of FIGS. 4-5 and/or 6. Alternatively, the volatile memory 718 may be used to store machine readable instructions to implement some or all of the example processes of FIGS. 4-5 and/or 6.

As an alternative to implementing the methods and/or apparatus described herein in a system such as the device of FIG. 7, the methods and or apparatus described herein may be embedded in a structure such as a processor and/or an ASIC (application specific integrated circuit).

Additionally, the examples disclosed herein have typically assumed certain voltage polarities for the operational characteristics of the devices, components, circuit elements, etc., used to implement the example methods and apparatus disclosed herein. In these examples, certain positive voltages and/or voltages exceeding a threshold may cause a particular device, component, circuit element, etc., to exhibit one characteristic (e.g., such as turning ON), whereas certain non-positive (e.g., zero and/or negative) voltages and/or voltages not exceeding a threshold may cause the device, component, circuit element, etc., to exhibit a different characteristic (e.g., such as turning OFF). However, it is readily apparent that the methods and apparatus described herein can be used in example implementations based on different, or opposite, polarity definitions. As such, the example methods and apparatus described herein can be readily adapted to ensure that appropriate control/activation voltages are present to provide protective isolation of device inputs during any over-voltage scenario.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to protect a device from an over-voltage condition, the apparatus comprising:
    a switch coupled between a device input and at least one component of the device; and
    a voltage compensator to pull a control input of the switch to a voltage associated with the device input to open the switch to protect the device component from the over-voltage condition, wherein the voltage compensator opens the switch for both a positive over-voltage condition and a negative over-voltage condition, the voltage compensator operable to open the switch both when the apparatus is in a powered condition or an unpowered condition using power from an input signal received by the device input.

2. An apparatus as defined in claim 1 wherein the voltage associated with the device input corresponds to a node voltage driven by the device input.

3. An apparatus as defined in claim 1 wherein the voltage compensator is operable to open the switch in response to an over-voltage condition when the device is in at least one of a sleep mode or an inactive mode.

4. An apparatus as defined in claim 1 further comprising a comparator to compare the voltage associated with the device input to a threshold to determine whether the over-voltage condition has occurred.

5. An apparatus as defined in claim 4 wherein the threshold is programmable.

6. An apparatus as defined in claim 4 further comprising a controller to generate a control signal to cause the control input to open the switch when the comparator determines that the voltage associated with the device input corresponds to the over-voltage condition.

7. An apparatus as defined in claim 6 wherein the voltage compensator comprises a negative voltage compensator, and including a voltage translator to couple the control signal to the negative voltage compensator to allow the negative voltage compensator to pull the control input of the switch to the voltage associated with the device input to open the switch when the over-voltage condition determined by the comparator corresponds to the negative over-voltage condition, but not when the over-voltage condition determined by the comparator corresponds to the positive over-voltage condition.

8. An apparatus as defined in claim 1 wherein the switch comprises a pair of transistors, wherein the control input of the switch comprises a gate input of at least one of the pair of transistors, and wherein the pair of transistors is configured to turn OFF to open the switch when a voltage associated with the gate input is not a predetermined amount greater than the voltage associated with the device input.

9. An apparatus as defined in claim 1 wherein the voltage compensator further comprises a pair of transistors configured to turn ON to pull the control input of the switch to the voltage associated with the device input when a negative over-voltage condition occurs but not when a positive over-voltage condition occurs.

10. An apparatus as defined in claim 9 wherein the pair of transistors is a first pair of transistors, and wherein the negative voltage compensator further comprises a second pair of transistors configured to prevent a voltage associated with the control input of the switch from going excessively negative when the device is in at least one of a sleep mode or an inactive mode.

11. An apparatus as defined in claim 10 wherein the voltage compensator further comprises a third pair of transistors configured to allow the voltage associated with the control input to discharge towards a ground potential after the voltage associated with the device input goes negative.

12. A method to protect a device from an over-voltage condition, the method comprising:
    closing a switch coupled between a device input and a component of the device when the over-voltage condition does not occur; and
    opening the switch for both a positive over-voltage condition and a negative over-voltage condition, wherein opening the switch comprises pulling a control input of the switch to a voltage associated with the device input, wherein opening the switch occurs both when the apparatus is in a powered condition or an unpowered condition using power from an input signal received by the device input.

13. A method as defined in claim 12 wherein the voltage associated with the device input corresponds to a node voltage driven by the device input.

14. A method as defined in claim 12 wherein the over-voltage condition comprises a positive over-voltage condition and a negative over-voltage condition, and wherein opening the switch further comprises pulling the control input of the switch to the voltage associated with the device input when the negative over-voltage condition occurs, but not when the positive over-voltage condition occurs.

15. A method as defined in claim 12 further comprising comparing the voltage associated with the device input to a threshold to determine whether the over-voltage condition has occurred.

16. A method as defined in claim 15 wherein the threshold is programmable.

17. A method as defined in claim 12 further comprising:
    opening the switch when the device is in at least one of a sleep mode or an inactive mode; and
    pulling the control input of the switch to the voltage associated with the device input when the device is in at least one of the sleep mode or the inactive mode to maintain the switch in an open position.

18. A method as defined in claim 17 wherein pulling the control input of the switch to the voltage associated with the device input when the device is in at least one of the sleep mode or the inactive mode comprises pulling the control input of the switch to the voltage associated with the device input when the voltage associated with the device input is negative, but not when the voltage associated with the device input is not negative.

19. A device with over-voltage protection, the device comprising:
    a device input to couple an input signal to a component of the device; and
    an over-voltage protection circuit coupled between the device input and the device component to protect the device component from an over-voltage condition comprising one of a positive over-voltage condition and a negative over-voltage condition associated with the device input, wherein the over-voltage protection circuit is configured to isolate the device component from the device input using a voltage associated with the device input instead of directing the voltage associated with the device input to ground when the over-voltage condition occurs, wherein opening a switch occurs both when the device is in a powered condition or an unpowered condition.

20. A device as defined in claim 19 wherein the voltage associated with the device input corresponds to a node voltage driven by the device input.

21. A device as defined in claim 19 wherein the device input and the device component comprise at least one of an audio line input coupled to an audio component or a video line input coupled to a video component, and wherein the over-voltage protection circuit is further configured to use the voltage associated with the device input to isolate the device component from the device input.

22. An over-voltage protection circuit for inclusion in a device, the over-voltage protection circuit comprising:
    a switch coupled between a device input and at least one component of the device, wherein the switch comprises a first pair of field effect transistors coupled together at a switch control node, wherein the switch control node is configured to turn the first pair of field effect transistors at least one of ON to close the switch or OFF to open the switch;
    a comparator to detect an over-voltage condition associated with the device input by comparing an input voltage at the device input to a threshold; and
    a voltage compensator to pull the switch control node to the input voltage at the device input to turn OFF the first pair of field effect transistors to open the switch when the detected over-voltage condition corresponds to a negative over-voltage condition but not when the detected over-voltage condition corresponds to a positive over-voltage condition, wherein the voltage compensator comprises a second pair of field effect transistors configured to turn ON to pull the switch control node to the input voltage at the device input when a negative over-voltage condition occurs, and wherein the second pair of field effect transistors are configured to turn OFF to have no substantial effect on the switch control node otherwise.

23. An over-voltage protection circuit as defined in claim 22 wherein the first pair of field effect transistors comprises a first field effect transistor and a second field effect transistor, wherein the second pair of field effect transistors comprises a third field effect transistor and a fourth field effect transistor, and further comprising a combination of a fifth field effect transistor and a diode coupled to the switch control node to pull the switch control node to substantially zero volts when the comparator detects the over-voltage condition, wherein substantially zero volts at the switch control node turns OFF the first pair of field effect transistors when the over-voltage condition corresponds to a positive over-voltage condition but not when the over-voltage condition corresponds to a negative over-voltage condition.

24. An over-voltage protection circuit as defined in claim 22 wherein the voltage compensator further comprises a third pair of field effect transistors configured to remain OFF when the device is active and to turn ON to provide a path between the device input and the switch control node when the device is inactive and the input voltage at the device input is negative.

* * * * *